United States Patent [19]

Staiger

[11] 4,224,184

[45] Sep. 23, 1980

[54] PREPARATION OF A COMPONENT FOR POLYMERIZATION CATALYSTS

[75] Inventor: Gerhard Staiger, Bobenheim-Roxheim, Fed. Rep. of Germany

[73] Assignee: BASF Aktiengesellschaft, Fed. Rep. of Germany

[21] Appl. No.: 57,087

[22] Filed: Jul. 12, 1979

[30] Foreign Application Priority Data

Jul. 20, 1978 [DE] Fed. Rep. of Germany ....... 2831830

[51] Int. Cl.$^2$ ................................................. C08F 4/64
[52] U.S. Cl. ................................. 252/429 B; 526/143
[58] Field of Search ..................................... 252/429 B

[56] References Cited

U.S. PATENT DOCUMENTS

| | | | |
|---|---|---|---|
| 3,317,499 | 5/1967 | Nakaguchi et al. | 252/429 B X |
| 3,380,981 | 4/1968 | Miller et al. | 252/429 B X |

*Primary Examiner*—Patrick Garvin
*Attorney, Agent, or Firm*—Keil & Witherspoon

[57] ABSTRACT

A special process for the preparation of a titanium component for polymerization catalysts of the Ziegler-Natta type, wherein (1) in a first stage (1.1) an alcoholate of the formula $Mg(OR)_2$, where R is lower alkyl, and (1.2) benzoyl chloride are milled together in a particular molar ratio in a vibratory ball mill under particular milling conditions, especially a relatively low temperature, in the absence of a diluent, thereafter (2) in a second stage (2.1) the material resulting from stage (1) is brought together with (2.2) titanium tetrachloride in a particular ratio, the batch is kept at an elevated temperature for some time, with constant mixing, and the resulting solid is isolated, excess titanium tetrachloride being removed, and finally (3) in a third stage (3.1) the solid resulting from stage (2) is again brought together with (3.2) titanium tetrachloride in a particular ratio, the batch is again kept at an elevated temperature for some time, with constant mixing, and the resulting solid, constituting the novel titanium component, is isolated, excess titanium tetrachloride being removed. The novel titanium component permits the preparation of $\alpha$-monoolefin polymers in high yield and with high isotacticity.

1 Claim, No Drawings

PREPARATION OF A COMPONENT FOR POLYMERIZATION CATALYSTS

The present invention relates to a process for the preparation of a titanium component for polymerization catalysts of the Ziegler-Natta type, especially for the homopolymerization and copolymerization of $C_2$-$C_6$-$\alpha$-monoolefins.

A plurality of embodiments of processes of the above type have been disclosed. Their object is in the main to produce titanium components which, after activation with organo-aluminum compounds or the like, give catalysts which when used for the polymerization of olefins give high specific yields of polyolefins and/or give polyolefins containing a relatively high proportion of stereoregular polymer. Further objects are to obtain polyolefins which have good handling characteristics, are easy to process further and possess the desired technological properties, which properties may show trends in various directions, depending on the envisaged end use.

The conventional processes have achieved substantial success; however, in most cases they still suffer from the shortcoming that the relevant titanium component, when used in catalysts of the Ziegler-Natta type for the polymerization of $\alpha$-olefins, either gives polymers which exhibit relatively high stereoregularity (isotacticity) but are only obtained in relatively low specific yields, or vice versa. In general, some other desirable features, for example in respect of the technological properties referred to, are also not achieved.

It is an object of the present invention to provide a process of the type defined at the outset, by means of which it is possible to obtain titanium components which exhibit improved technical properties and which in particular permit, for example, the production of polymers, especially of polymers obtained by suspension polymerization in liquid monomers, which possess particularly good morphological properties, ie. are easily handled and processed.

I have found that this object is achieved if, in a first stage, a particular magnesium alcoholate is milled with benzoyl chloride under particular conditions, and the material resulting from the first stage is then reacted with titanium tetrachloride under particular conditions, especially including particular temperature conditions, in a second stage and in a subsequent but separate third stage.

Accordingly, the present invention relates to a process for the preparation of a titanium component for polymerization catalysts of the Ziegler-Natta type, wherein (1) in a first stage (1.1) 100 parts by weight of an alcoholate of the general formula $Mg(OR)_2$, where R is alkyl of 1 to 6, preferably of 2 to 4, carbon atoms, are milled with (1.2) such parts by weight of benzoyl chloride as correspond to a molar ratio of alcoholate (1.1): benzoyl chloride (1.2) of from 100:500 to 100:100, preferably from 100:10 to 100:50, in a vibratory ball mill with a milling acceleration of from 30 to 80, preferably from 45 to 55, m.sec$^{-2}$ for a period of from 2 to 100, preferably from 5 to 50, hours at from $-50°$ to $+10°$ C., preferably from $-30°$ to $-10°$ C., in the absence of a diluent, thereafter (2) in a second stage (2.1) 100 parts by weight of the material resulting from stage (1) are brought together with (2.2) from 300 to 1,800, preferably from 500 to 1,000, parts by weight of titanium tetrachloride, the batch is kept at from 40° to 180° C., preferably from 70° to 100° C., for from 0.1 to 5 hours, preferably from 0.5 to 2 hours, with constant mixing, and the resulting solid is isolated, excess titanium tetrachloride being removed, and finally (3) in a third stage (3.1) 100 parts by weight of the solid resulting from stage (2) are again brought together with (3.2) from 300 to 1,800, preferably from 500 to 1,000, parts by weight of titanium tetrachloride, the batch is kept at from 40° to 180° C., preferably from 120° to 140° C., for from 0.1 to 5 hours, preferably from 0.5 to 2 hours, with constant mixing, and the resulting solid is isolated, excess titanium tetrachloride being removed.

The materials used in the novel process do not exhibit any special features, since components (1.1) and (1.2) are well-known from organic chemistry. It may however be noted that particularly suitable alcoholates (1.1) are those derived from ethyl, n-propyl, i-propyl, n-butyl, sec.-butyl or tert.-butyl alcohol. The titanium tetrachloride to be employed, (2.2) and (3.2), should advantageously be of the type conventionally used for polymerization catalysts.

The process according to the invention is simple to carry out and can be implemented by those skilled in the art without additional explanations. It may however be mentioned, in respect of stages (2) and (3), that the solid resulting in each of these can advantageously be isolated by suction filtration, and that excess titanium tetrachloride can advantageously be removed by washing with a liquid hydrocarbon until the latter no longer takes up titanium tetrachloride. Appropriate liquid hydrocarbons are of the type which are conventionally brought together with titanium components for catalysts of the Ziegler-Natta type without detriment to the catalyst or its titanium component, for example as in the polymerization of $\alpha$-monoolefins. Examples of suitable hydrocarbons are pentanes, hexanes, heptanes, gasolines and cyclohexane.

The titanium components for catalysts of the Ziegler-Natta type, prepared by the process according to the invention, can be used in $\alpha$-olefin polymerization in the relevant conventional manner, ie. they are in general used together with an organo-metallic activator, especially an aluminumalkyl compound of the formula Al(alkyl)$_3$ or ClAl(alkyl)$_2$, where alkyl is of 1 to 8 carbon atoms, and especially with triethyl-aluminum or diethyl-aluminum chloride.

I have found that it is in many cases advantageous to use the novel titanium component in polymerization, not only together with an activator of the above type but also with a relevant conventional promoter. In the present context, particularly suitable promoters have proved to be esters of a $C_1$-$C_4$-alkanol with a p-alkylbenzoic acid or, preferably, a p-alkoxybenzoic acid, alkyl and alkoxy being of 1 to 4 carbon atoms; a typical example is ethyl anisate.

The titanium components prepared by the process according to the invention give particularly good results in the dry-phase polymerization of $\alpha$-olefins, ie. polymerization in the absence of a liquid auxiliary medium; however, polymerization in the presence of such a medium can also be carried out with good success. The molecular weight can be varied by means of the conventional regulators, especially hydrogen. Particularly suitable α-olefins to be polymerized using the novel components are those of 2 to 6 carbon atoms, especially propylene, but-1-ene and 4-methylpent-1-ene and—in the case of copolymerizations—ethylene.

EXAMPLE (A) Preparation of the titanium component of the polymerization catalyst.
(1) In the first stage,
  (1.1) 100 parts by weight of magnesium ethylate, $Mg(OC_2H_5)_2$, are milled with
  (1.2) such parts by weight of benzoyl chloride (namely 20.5 parts by weight) as correspond to a molar ratio of alcoholate (1.1): benzoyl chloride (1.2) of 100:16.7 in a vibratory ball mill, with a milling acceleration of 51 m.sec$^{-2}$, at $-20°$ C. for 15 hours, in the absence of a diluent.
(2) In the second stage,
  (2.1) 100 parts by weight of the material resulting from stage (1) are brought together with
  (2.2) 600 parts by weight of titanium tetrachloride and the batch is kept at from 75° to 85° C. for 1 hour, with constant stirring. The resulting solid is then isolated by filtering, and washing with n-heptane, the washing being continued until titanium tetrachloride is no longer detectable in the filtrate.
(3) In the third stage,
  (3.1) 100 parts by weight of the solid resulting from stage (2) are again brought together with
  (3.2) 650 parts by weight of titanium tetrachloride and the batch is kept at from 128° to 132° C. for 1 hour, with constant stirring. The resulting solid is then isolated by filtering, and washing with n-heptane until titanium tetrachloride is no longer detectable in the filtrate.

This method gives a titanium component which has a titanium content of 4.5% by weight and a chlorine content of 61.9% by weight.

(B) Polymerization by means of the titanium component.

A stirred vessel is charged with 500 ml of n-heptane, 0.4 g of the titanium component, 10 mmoles of aluminum triethyl and 2 mmoles of ethyl anisate (as the promoter).

The actual polymerization is carried out for 3 hours at 60° C., with constant stirring, using propylene as the monomer, whose pressure is kept constant at 1 bar throughout the polymerization.

The polymer is obtained in a yield of 517 g of polypropylene per g of titanium component; it contains 8.8% of material soluble in boiling n-heptane.

I claim:

1. A process for the preparation of a titanium component for polymerization catalysts of the Ziegler-Natta type, wherein
  (1) in a first stage
    (1.1) 100 parts by weight of an alcoholate of the general formula $Mg(OR)_2$, where R is alkyl of 1 to 6 carbon atoms, are milled with
    (1.2) such parts by weight of benzoyl chloride as correspond to a molar ratio of alcoholate (1.1): benzoyl chloride (1.2) of from 100:5 to 100:100, in a vibratory ball mill with a milling acceleration of from 30 to 80 m.sec$^{-2}$ for a period of from 2 to 100 hours at from $-50°$ to $+10°$ C. in the absence of a diluent, thereafter
  (2) in a second stage
    (2.1) 100 parts by weight of the material resulting from stage (1) are brought together with
    (2.2) from 300 to 1,800 parts by weight of titanium tetrachloride, the batch is kept at from 40° to 180° C. for from 0.1 to 5 hours, with constant mixing, and the resulting solid is isolated, excess titanium tetrachloride being removed, and finally
  (3) in a third stage
    (3.1) 100 parts by weight of the solid resulting from stage (2) are again brought together with
    (3.2) from 300 to 1,800 parts by weight of titanium tetrachloride, the batch is kept at from 40° to 180° C. for from 0.1 to 5 hours, with constant mixing, and the resulting solid is isolated, excess titanium tetrachloride being removed.

* * * * *